United States Patent

Weng et al.

[11] Patent Number: 6,063,846
[45] Date of Patent: May 16, 2000

[54] POLYVINYL CHLORIDE COMPOSITIONS

[75] Inventors: Dexi Weng, Cumberland; John C. Andries, E. Greenwich; Keith G. Saunders, Cumberland, all of R.I.

[73] Assignee: Teknor Apex Company, Pawtucket, R.I.

[21] Appl. No.: 08/866,737

[22] Filed: May 30, 1997

[51] Int. Cl.⁷ .................................................. C08J 5/12
[52] U.S. Cl. ..................... 524/296; 524/297; 524/504; 524/505; 524/519; 524/569
[58] Field of Search ............................ 524/296, 297, 524/504, 505, 519, 569

[56] References Cited

U.S. PATENT DOCUMENTS 5,380,786  1/1995  Greenlee et al. ................. 524/560
5,446,064  8/1995  Hori et al. ....................... 524/536

*Primary Examiner*—Peter D. Mulcahy
*Attorney, Agent, or Firm*—Fish & Richardson P.C.

[57] ABSTRACT

Compositions of a plasticized polyvinyl chloride resin, a polyolefin and/or a styrenic polymer, and a compatibilizer are disclosed. The compositions retain the mechanical properties of tensile strength, elongation, and a low brittle point, even after being subjected to high heat for an extended period of time.

29 Claims, No Drawings

POLYVINYL CHLORIDE COMPOSITIONS

BACKGROUND OF THE INVENTION

This invention relates to compositions of plasticized polyvinyl chloride resins and polyolefins.

A variety of rigid polyvinyl chloride (PVC) resin and polyolefin blends is known. As these two materials are normally incompatible, compatibilizers are sometimes added to improve the physical and mechanical properties of the blends. Blends made from rigid PVC and polyolefins are useful in applications such as the manufacture of rigid plastic pipes and tubing.

Plasticized PVC has different properties than rigid PVC; it is more flexible than non-plasticized PVC and can therefore be used in different applications. Plasticized PVC compositions can be used, for example, as wire and cable insulation and jacketing, in automotive applications, and as components of medical devices.

SUMMARY OF THE INVENTION

In a first aspect, the invention features a thermoplastic composition that includes a plasticized polyvinyl chloride resin; a polyolefin, preferably a polyolefin that is a thermoplastic elastomer; and a compatibilizer. The composition preferably contains at least about 5 parts of the polyolefin and at least about 5 parts of the compatibilizer (based on 100 parts by weight of the plasticized polyvinyl chloride resin).

The composition may further include a styrenic polymer, preferably a styrenic polymer that is a thermoplastic elastomer. It is preferred that the combined amount of the polyolefin and the styrenic polymer in this composition is at least about 5 parts (based on 100 parts by weight of the plasticized polyvinyl chloride resin).

In another aspect, the invention features a thermoplastic composition that includes a plasticized polyvinyl chloride resin; a styrenic polymer, preferably a thermoplastic elastomer; and a compatibilizer. The composition preferably contains at least about 5 parts of the styrenic polymer and at least about 5 parts of the compatibilizer (based on 100 parts by weight of the plasticized polyvinyl chloride resin).

The compositions exhibit excellent retention of mechanical properties after being aged. For example, preferred compositions have elongation retentions of about 65% to about 150%. Preferred compositions also have tensile strength retentions of about 65% to about 200%. In addition, the brittle points of preferred compositions increase less than about 5° C. after the compositions have been aged.

The term "aged," as used herein, means that a composition or material has been subjected to 125° C. heat for a period of 7 consecutive days.

Other features and advantages of the invention will be apparent from the following description of the preferred embodiments thereof, and from the claims.

DESCRIPTION OF THE PREFERRED EMBODIMENTS

A preferred composition includes a plasticized polyvinyl chloride resin, a polyolefin, and a compatibilizer.

"Polyvinyl chloride" or "PVC," as used herein, include homopolymers of vinyl chloride, as well as polymerization products of vinyl chloride and one or more co-monomers. For example, the polyvinyl chloride resin can be a copolymer of vinyl chloride and ethylene, or a copolymer of vinyl chloride and propylene. The polyvinyl chloride resin can also be the polymerization product of vinyl chloride and an ester monomer having the formula $H_2C=C(R^1)C(=O)OR^2$, where $R^1$ and $R^2$ are, independently, $C_{1-12}$ alkyl. An example of such a resin is a copolymer of a vinyl chloride monomer and a methyl methacrylate monomer. These resins may be used alone or in combination.

"Plasticized polyvinyl chloride" or "plasticized PVC," as used herein, include PVC plasticized with an internal plasticizer (i.e., a co-monomer that is co-polymerized with vinyl chloride monomer) or an external plasticizer (i.e., a compound that is incorporated into PVC). Preferably, the compositions contain at least about 10 parts plasticizer (based on 100 parts by weight of the polyvinyl chloride resin). Suitable plasticizers include phthalates, trimelletates, pyromelletates, azelates, adipates, polyesters, pentaerythritol esters, ethylene/vinyl acetate copolymers, and butyl/acrylate/carbon monoxide terpolymers. The plasticizers may be used alone or in combination. A preferred plasticizer is dioctyl phthalate.

The compositions preferably contain at least about 5 parts, and more preferably at least about 10 parts, of the polyolefin (based on 100 parts by weight of the plasticized polyvinyl chloride resin). It is preferred that the polyolefin is a thermoplastic elastomer. Suitable polyolefins include homopolymers, such as polyethylene and polypropylene. Suitable polyolefins also include copolymers that are thermoplastic elastomers, such as a copolymer of ethylene and propylene (EP rubber); a copolymer of ethylene and an α-olefin having at least 4 carbons; or a copolymer of ethylene, propylene, and a non-conjugated diene monomer (EPDM). The polyolefins may be used alone or in combination.

The polyolefins can be in various forms. For example, the polyethylene used in the invention can be any form of polyethylene, such as high density polyethylene (HDPE), low density polyethylene, (LDPE), linear low density polyethylene (LLDPE), or very low density polyethylene (VLDPE).

Preferred polyolefins include a copolymer of ethylene and 1-octene that is a metallocene-catalyzed reaction product of these two monomers (with 25% 1-octene), available from DuPont-Dow Elastomers under the trade name ENGAGE 8150; a copolymer of ethylene, propylene, and a non-conjugated diene monomer (EPDM), available from Uniroyal Chemical under the trade name ROYALENE 580HT; and a copolymer of ethylene and 1-butene, available from Exxon Chemicals under the trade name EXACT 3035.

Since plasticized polyvinyl chloride resins and polyolefins are normally incompatible, compositions that include these ingredients generally have poor mechanical properties. The addition of certain compounds (suitably called compatibilizers) enhances the compatibility of the plasticized polyvinyl chloride resin and the polyolefins; the resulting compositions can therefore have desired mechanical properties.

Preferred compositions contain at least about 5 parts, and more preferably at least about 10 parts, of the compatibilizer (based on 100 parts by weight of the plasticized polyvinyl chloride resin). Suitable compatibilizers include chlorinated polyolefins; polyolefin-polyurethane graft copolymers (preferably produced by reactive extrusion of functionalized polyolefins and polyurethanes); hydrogenated styrene-butadiene-styrene-polyester tetrablock copolymers; and hydrogenated styrene-isoprene-styrene-polyester tetrablock copolymers. The compatibilizers may be used alone or in combination.

When chlorinated polyethylene (CPE) is used as the compatibilizer, it is preferred that the CPE has a chlorine content of about 5% to about 50% by weight. It is also preferred that the CPE is the chlorinated product of a slurry process. The chlorination process generally decreases the crystallinity of the material; it is preferred that the CPE has a residual polyethylene crystallinity of at least about 0.5% (measured by differential scanning calorimetry). A preferred compatibilizer is chlorinated polyethylene, available from Dow Chemical under the trade name TYRIN 3623A.

Another preferred composition includes a plasticized polyvinyl chloride resin, a polyolefin, a styrenic polymer, and a compatibilizer. It is preferred that the combined amount of the polyolefin and the styrenic polymer in this composition is at least about 5 parts, and more preferably at least about 10 parts (based on 100 parts by weight of the plasticized polyvinyl chloride resin). It is also preferred that the styrenic polymer is a thermoplastic elastomer. Suitable styrenic polymers include styrene-butadiene-styrene triblock copolymers (SBS), hydrogenated styrene-butadiene-styrene triblock copolymers (SEBS), hydrogenated styrene-butadiene diblock copolymers (SEB), styrene-isoprene-styrene triblock copolymers (SIS), hydrogenated styrene-isoprene-styrene triblock copolymers (SEPS), and hydrogenated styrene-isoprene diblock copolymers (SEP). The styrenic polymers may be used alone or in combination. A preferred styrenic polymer is a hydrogenated styrene-butadiene-styrene triblock copolymer, available from Shell Chemical under the trade name KRATON G-1652.

Another preferred composition includes a plasticized polyvinyl chloride resin, a styrenic polymer, and a compatibilizer. The composition preferably contains at least about 5 parts, and more preferably at least about 10 parts, of the styrenic polymer (based on 100 parts by weight of the plasticized polyvinyl chloride resin). Suitable amounts of each of the other components, as well as suitable examples of each of these components, are as described above.

The preferred compositions may also contain ingredients such as lubricants, stabilizers, antioxidants, and fillers. Examples of suitable lubricants include stearic acid, metal salts of stearic acid, wax, and polyethylene glycols. The lubricants may be used alone or in combination. Preferred lubricants include stearic acid, available from Henkel Corporation as Stearic Acid GP Grade, and zinc stearate, available from The Norac Company under the trade name COAD 21.

Examples of suitable stabilizers include barium/zinc heat stabilizers, lead stabilizers, and organic heat stabilizers. The stabilizers may be used alone or in combination. Preferred stabilizers include a barium/zinc stabilizer, available from Witco under the trade name MARK 4782-A, and epoxidized soybean oil, available from Witco under the trade name E-54 EPO.

Examples of suitable antioxidants include phenolic and thioester antioxidants. The antioxidants may be used alone or in combination. A preferred antioxidant is tetrakis [methylene (3,5-di-t-butyl-4-hydroxylhydrocinnamate)] methane, available from Ciba Geigy under the trade name IRGANOX 1010.

Examples of suitable fillers include Kaolin clay, calcium carbonate, and other fillers commonly used in PVC compositions. The fillers may be used alone or in combination.

The compositions are generally prepared according to conventional dry blend or wet blend methods known to those skilled in the art of PVC compounding.

The mixtures obtained from the blending process can be further compounded with a mixer such as a BANBURY® batch mixer, a Farrel Continuous Mixer, or a single or twin screw extruder.

The compositions are useful in a variety of applications. For example, these compositions are useful in applications in which it is desirable for compositions to maintain mechanical properties such as tensile strength, elongation, and a low brittle point, even when the compositions are subjected to high temperatures for extended periods of time. Such applications include wire and cable insulation and jacketing, garden hoses, medical devices, automotive parts, and construction materials.

EXAMPLES

The following compositions were prepared as follows. The ingredients were mixed in a BANBURY® internal mixer at 60 psi steam pressure, speed 5, for approximately 5 minutes, or until the temperature reached 330–360° F. The resultant mix was milled in a heated two-roll mill, then cooled to room temperature (25° C.). Test specimens were prepared according to ASTM protocols as follows. The cooled milled sheets were die cut into small pieces for injection molding. Test plaques were injection molded into 1/16"–1/8" step mold plaques in an Arburg 221-55-250 injection molding machine at temperatures of 180° C.–190° C. ASTM test pieces were then die cut from the injection molded plaques. All tests were carried out according to the appropriate ASTM protocols.

Air circulating ovens were used to age the compositions; the temperature in the ovens was maintained at the desired setting, with a maximum ±0.2° C. variation.

One preferred composition contains the following ingredients (based on 100 parts of polyvinyl chloride resin):

| Composition No. 1 Ingredient | Amount |
| --- | --- |
| Polyvinyl chloride resin[1] | 100 |
| Dioctyl phthalate | 80 |
| Barium/zinc heat stabilizer[2] | 5.91 |
| Epoxidized soybean oil[3] | 9.84 |
| Stearic acid[4] | 0.39 |
| Zinc stearate[5] | 0.39 |
| Antioxidant[6] | 0.28 |
| Chlorinated polyethylene[7] | 55.96 |
| Ethylene/1-octene copolymer[8] | 28.12 |

[1]OXY 240, commercially available from Occidental Chemical
[2]MARK 4782-A Barium—Zinc, commercially available from Witco
[3]E-54 EPO regular, commercially available from Witco
[4]Stearic Acid GP Grade, commercially available from Henkel Corporation
[5]COAD 21, commercially available from The Norac Company
[6]Irganox 1010, commercially available from Ciba Geigy
[7]TYRIN 3623A (medium molecular weight, 36% chlorine content), commercially available from Dow Chemical Company
[8]ENGAGE 8150, a metallocene-catalyzed polymerization product of ethylene and 1-octene (with 25% 1-octene), commercially available from DuPont-Dow Elastomers This composition exhibits the following physical properties (as tested according to the designated ASTM procedure):

| Elongation (%) | 380 (ASTM D-412) |
| --- | --- |
| Elongation Retention (%) | 74 |
| Tensile strength (psi) | 1417 (ASTM D-412) |
| Tensile strength retention (%) | 127 |
| Brittle Point (° C.) | −51 (ASTM D-746) |

-continued

| | |
|---|---|
| Aged Brittle Point (° C.) | −53 (ASTM D-746) |
| Hardness A (inst., Shore A) | 75 (ASTM D-2240) |
| Hardness (15 sec. dwell, Shore A) | 69 (ASTM D-2240) |
| Specific Gravity | 1.14 (ASTM D-297) |
| Melt Flow Rate (177C 5 kg, g/10 min) | 5.20 (ASTM D-1238) |
| Compression Set (22 hrs, 70° C.) (%) | 76 (ASTM D-395) |
| Compression Set (22 hrs, 23° C.) (%) | 40 (ASTM D-395) |
| Tear Resistance (Die C, pli) | 233 (ASTM D-624) |

In the above table, elongation retention is defined as $E_{aged}/E_{original}$. The value for the original elongation ($E_{original}$) is measured before the composition is aged; the value for the aged elongation ($E_{aged}$) is measured after the composition has been subjected to 125° C. heat for 7 consecutive days. Ideally, a heat resistant PVC composition exhibits an elongation retention of 100%. The closer this value is to 100%, the more heat resistant the composition is.

Similarly, tensile strength retention is defined as tensile strength$_{aged}$/tensile strength$_{original}$, where the value for tensile strength$_{original}$ is measured before aging, and the value for tensile strength$_{aged}$ is measured after aging for 7 consecutive days. Ideally, a heat resistant PVC composition has a tensile strength retention of 100%. The closer this value is to 100%, the more heat resistant the composition is.

The brittle point is the temperature below which a composition becomes brittle, rather than ductile and flexible. Ideally, a composition that will be subjected to high and low temperatures has a brittle point that does not become higher when the composition is aged.

As the above table illustrates, this composition retains the mechanical properties of tensile strength, elongation, and a low brittle point after aging.

A second preferred composition is as follows:

| Composition No. 2 Ingredient | Amount |
|---|---|
| Polyvinyl chloride resin | 100 |
| Dioctyl phthalate | 80 |
| Barium/zinc heat stabilizer | 5.91 |
| Epoxidized soybean oil | 9.84 |
| Stearic acid | 0.39 |
| Zinc stearate | 0.39 |
| Antioxidant | 0.28 |
| Chlorinated polyethylene | 27.84 |
| Ethylene/1-octene copolymer | 56.24 |

The identity of the ingredients is the same as in Composition No. 1. Composition No. 2 has the following physical properties:

| | |
|---|---|
| Elongation (%) | 387 (ASTM D-412) |
| Elongation Retention (%) | 102 |
| Tensile strength (psi) | 1336 (ASTM D-412) |
| Tensile strength retention (%) | 137 |
| Brittle Point (° C.) | −53 (ASTM D-746) |
| Aged Brittle Point (° C.) | −56 (ASTM D-746) |
| Hardness A (inst., Shore A) | 70 (ASTM D-2240) |
| Hardness (15 sec. dwell, Shore A) | 64 (ASTM D-2240) |
| Specific Gravity | 1.10 (ASTM D-297) |
| Melt Flow Rate (177C 5 kg, g/10 min) | 5.80 (ASTM D-1238) |
| Compression Set (22 hrs, 70° C.) (%) | 77 (ASTM D-395) |
| Compression Set (22 hrs, 23° C.) (%) | 34 (ASTM D-395) |
| Tear Resistance (Die C, pli) | 257 (ASTM D-624) |

Composition No. 2 also retains the mechanical properties of tensile strength, elongation, and a low brittle point after aging.

A third preferred composition has the following composition:

| Composition No. 3 Ingredient | Amount |
|---|---|
| Polyvinyl chloride resin | 100 |
| Dioctyl phthalate | 80.32 |
| Barium/zinc heat stabilizer | 5.91 |
| Epoxidized soybean oil | 9.84 |
| Stearic acid | .39 |
| Zinc Stearate | .39 |
| Antioxidant | .28 |
| Chlorinated polyethylene | 27.84 |
| Copolymer of ethylene, propylene, and a non-conjugated diene monomer (EPDM) | 56.24 |

The identity of the ingredients is the same as in Composition No. 1 except that instead of an ethylene/1-octene copolymer, EPDM is used. An example of a suitable commercially available EPDM polymer for this purpose is ROYALENE 580HT from Uniroyal Chemical. The physical properties of this composition are as follows:

| | |
|---|---|
| Elongation (%) | 318 (ASTM D-412) |
| Elongation Retention (%) | 83 |
| Tensile strength (psi) | 887 (ASTM D-412) |
| Tensile strength retention (%) | 144 |
| Brittle Point (° C.) | −55 (ASTM D-746) |
| Aged Brittle Point (° C.) | −60 (ASTM D-746) |
| Hardness A (inst., Shore A) | 65 (ASTM D-2240) |
| Hardness (15 sec. dwell, Shore A) | 59 (ASTM D-2240) |
| Specific Gravity | 1.08 (ASTM D-297) |
| Melt Flow Rate (177C 5 kg, g/10 min) | 3.85 (ASTM D-1238) |
| Compression Set (22 hrs, 70° C.) (%) | 69 (ASTM D-395) |
| Compression Set (22 hrs, 23° C.) (%) | 33 (ASTM D-395) |
| Tear Resistance (Die C, pli) | 164 (ASTM D-624) |

Thus, a composition containing a different polyolefin (i.e., EPDM) also retains the properties of elongation, tensile strength, and a low brittle point after aging.

A fourth preferred composition is as follows:

| Composition No. 4 | Amount |
|---|---|
| Polyvinyl chloride resin | 100 |
| Dioctyl phthalate | 80.32 |
| Barium/zinc heat stabilizer | 5.91 |
| Epoxidized soybean oil | 9.84 |
| Stearic acid | .39 |
| Zinc stearate | .39 |
| Antioxidant | .28 |
| Chlorinated polyethylene | 27.84 |
| Ethylene/1-butene copolymer | 56.24 |

In this composition, the ingredients are the same as those of Composition No. 1 except that instead of a copolymer of ethylene and 1-octene, a copolymer of ethylene and 1-butene is used. An example of a suitable commercially available copolymer of ethylene and 1-butene is EXACT 3035 from Exxon Chemicals. The properties of this composition are as follows:

| Elongation (%) | 368 (ASTM D-412) |
| Elongation Retention (%) | 73 |
| Tensile strength (psi) | 1198 (ASTM D-412) |
| Tensile strength retention (%) | 140 |
| Brittle Point (° C.) | −49 (ASTM D-746) |
| Aged Brittle Point (° C.) | −46 (ASTM D-746) |
| Hardness A (inst., Shore A) | 71 (ASTM D-2240) |
| Hardness (15 sec. dwell, Shore A) | 65 (ASTM D-2240) |
| Specific Gravity | 1.11 (ASTM D-297) |
| Melt Flow Rate (177C 5 kg, g/10 min) | 9.86 (ASTM D-1238) |
| Compression Set (22 hrs, 70° C.) (%) | 70 (ASTM D-395) |
| Compression Set (22 hrs, 23° C.) (%) | 30 (ASTM D-395) |
| Tear Resistance (Die C, pli) | 281 (ASTM D-624) |

This composition, which contains yet another polyolefin, i.e., a copolymer of ethylene and 1-butene, also shows good retention of the mechanical properties of elongation, tensile strength, and a low brittle point after aging.

Another preferred composition is as follows:

| Composition No. 5 Ingredient | Amount | |
|---|---|---|
| Polyvinyl chloride resin | 100 | |
| Dioctyl phthalate | 80 | 32 |
| Barium/zinc heat stabilizer | 5.91 | |
| Epoxidized soybean oil | 9.84 | |
| Stearic acid | .39 | |
| Zinc stearate | .39 | |
| Antioxidant | .28 | |
| Chlorinated polyethylene | 27.84 | |
| Hydrogenated styrene-butadiene-styrene triblock copolymer (SEBS) | 56.24 | |

The identity of the ingredients is the same as in Composition No. 1 except that instead of a copolymer of ethylene and 1-octene, a hydrogenated styrene-butadiene-styrene triblock copolymer is used. An example of a commercially available hydrogenated styrene-butadiene-styrene triblock copolymer is KRATON G-1652 from Shell Chemical. The physical properties of this composition are as follows:

| Elongation (%) | 240 (ASTM D-412) |
| Elongation Retention (%) | 93 |
| Tensile strength (psi) | 773 (ASTM D-412) |
| Tensile strength retention (%) | 200 |
| Brittle Point (° C.) | −45 (ASTM D-746) |
| Aged Brittle Point (° C.) | −42 (ASTM D-746) |
| Hardness A (inst., Shore A) | 65 (ASTM D-2240) |
| Hardness (15 sec. dwell, Shore A) | 59 (ASTM D-2240) |
| Specific Gravity | 1.14 (ASTM D-297) |
| Melt Flow Rate (177C 5 kg, g/10 min) | 13.74 (ASTM D-1238) |
| Compression Set (22 hrs, 70° C.) (%) | 72 (ASTM D-395) |
| Compression Set (22 hrs, 23° C.) (%) | 33 (ASTM D-395) |
| Tear Resistance (Die C, pli) | 184 (ASTM D-624) |

This composition, which contains a styrenic polymer, exhibits good retention of the mechanical properties of elongation and a low brittle point.

Other embodiments are within the following claims.

What is claimed is:

1. A thermoplastic composition comprising a polyvinyl chloride resin, an external plasticizer, a polyolefin selected from the group consisting of (i) a copolymer of ethylene and 1-octene, wherein said copolymer is a metallocene-catalyzed polymerization product of ethylene and 1-octene, (ii) a copolymer of ethylene and 1-butene, and (iii) a copolymer of ethylene, propylene and a non-conjugated diene monomer, and a compatibilizer selected from the group consisting of chlorinated polyolefins, polyolefin-polyurethane graft copolymers, hydrogenated styrene-butadiene-styrene-polyester tetrablock copolymers, and hydrogenated styrene-isoprene-styrene-polyester tetrablock copolymers, wherein the thermoplastic composition includes from about 5 to about 31 parts compatibilizer per 100 parts of the polyvinyl chloride and the external plasticizer combined.

2. The composition of claim 1, wherein said polyolefin comprises a thermoplastic elastomer.

3. The composition of claim 1, wherein said polyvinyl chloride resin comprises a vinyl chloride homopolymer.

4. The composition of claim 1, wherein said polyvinyl chloride resin comprises a polymerization product of vinyl chloride and at least one co-monomer selected from the group consisting of ethylene, propylene, and esters having the formula $H_2C=C(R^1)C(=O)OR^2$, wherein $R^1$ and $R^2$ are, independently, $C_{1-12}$ alkyl.

5. The composition of claim 1, wherein said external plasticizer is selected from the group consisting of phthalates, trimelletates, pyromelletates, azelates, adipates, polyesters, pentaerythritol esters, ethylene/vinyl acetate copolymers, and butyl/acrylate/carbon monoxide terpolymers.

6. The composition of claim 5, wherein said comprises dioctyl phthalate.

7. The composition of claim 1, wherein said compatibilizer comprises chlorinated polyethylene.

8. The composition of claim 7, wherein said chlorinated polyethylene has a chlorine content of about 5% to about 50% by weight.

9. The composition of claim 1, wherein said composition has an elongation retention of about 65% to about 150%.

10. The composition of claim 1, wherein the brittle point of said composition increases by less than about 5° C. when said composition is aged.

11. The composition of claim 1, wherein said composition has a tensile strength retention of about 65% to about 200%.

12. The composition of claim 1, wherein said composition comprises (based on 100 parts by weight of polyvinyl chloride resin):

(a) 100 parts of said polyvinyl chloride resin;

(b) at least about 5 parts of said polyolefin; and (c) at least about 5 parts of said compatibilizer.

13. The composition of claim 12, wherein said polyvinyl chloride resin comprises at least about 10 parts of said external plasticizer (based on 100 parts by weight of polyvinyl chloride resin).

14. The composition of claim 1, wherein said composition comprises (based on 100 parts by weight of polyvinyl chloride resin):

(a) 100 parts of said polyvinyl chloride resin;

(b) at least about 10 parts of said polyolefin; and (c) at least about 10 parts of said compatibilizer.

15. The composition of claim 1, wherein said composition further comprises a styrenic polymer.

16. The composition of claim 15, wherein said styrenic polymer comprises a thermoplastic elastomer.

17. The composition of claim 15, wherein said styrenic polymer is selected from the group consisting of styrene-butadiene-styrene triblock copolymers, hydrogenated styrene-butadiene-styrene triblock copolymers, hydrogenated styrene-butadiene diblock copolymers, styrene-isoprene-styrene triblock copolymers, hydrogenated styrene-isoprene-styrene triblock copolymers, and hydrogenated styrene-isoprene diblock copolymers.

18. The composition of claim 15, wherein said styrenic polymer comprises a hydrogenated styrene-butadiene diblock copolymer.

19. The composition of claim 15, wherein said styrenic polymer comprises a hydrogenated styrene-butadiene-styrene triblock copolymer.

20. The composition of claim 15, wherein said composition comprises (based on 100 parts by weight of polyvinyl chloride resin):

(a) 100 parts of said polyvinyl chloride resin;

(b) at least about 5 parts of said compatibilizer;

(c) said polyolefin; and (d) said styrenic polymer, the combined amount of said polyolefin and said styrenic polymer being at least about 5 parts.

21. The composition of claim 20, wherein said polyvinyl chloride resin comprises at least about 10 parts of said external plasticizer (based on 100 parts by weight of polyvinyl chloride resin).

22. The composition of claim 15, wherein said composition comprises (based on 100 parts by weight of polyvinyl chloride resin):

(a) 100 parts of said polyvinyl chloride resin;

(b) at least about 10 parts of said compatibilizer;

(c) said polyolefin; and (d) said styrenic polymer, the combined amount of said polyolefin and said styrenic polymer being at least about 10 parts.

23. A thermoplastic composition comprising polyvinyl chloride, dioctyl phthalate, chlorinated polyethylene, and a polyolefin selected from the group consisting of (i) a copolymer of ethylene and 1-octene, wherein said copolymer is a metallocene-catalyzed polymerization product of ethylene and 1-octene; (ii) a copolymer of ethylene and 1-butene; and (iii) a copolymer of ethylene, propylene and a non-conjugated diene monomer, wherein the thermoplastic composition includes from about 5 to about 31 parts chlorinated polyethylene per 100 parts of the polyvinyl chloride and the dioctyl phthalate combined.

24. A cable comprising the thermoplastic composition of claim 1.

25. An automotive part comprising the thermoplastic composition of claim 1.

26. A medical device comprising the thermoplastic composition of claim 1.

27. The thermoplastic composition of claim 23, wherein the brittle point of the composition increases by less than about 5° C. when the composition is aged.

28. The composition of claim 1, wherein the polyolefin is a copolymer of ethylene and 1-butene.

29. The composition of claim 1, wherein the polyolefin is a copolymer of ethylene, propylene and a non-conjugated diene monomer.

* * * * *